(12) United States Patent
Auer

(10) Patent No.: US 8,627,311 B2
(45) Date of Patent: Jan. 7, 2014

(54) SYSTEMS, METHODS, AND APPARATUS TO DEPLOY SOFTWARE

(75) Inventor: John Auer, Milpitas, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 430 days.

(21) Appl. No.: 13/019,052

(22) Filed: Feb. 1, 2011

(65) Prior Publication Data

US 2012/0198438 A1 Aug. 2, 2012

(51) Int. Cl.
*G06F 9/445* (2006.01)

(52) U.S. Cl.
USPC .......................................................... 717/176

(58) Field of Classification Search
None
See application file for complete search history.

(56) References Cited

U.S. PATENT DOCUMENTS

| 7,243,271 | B2 | 7/2007 | Teegan et al. | |
|---|---|---|---|---|
| 2002/0091815 | A1 | 7/2002 | Anderson et al. | |
| 2005/0102665 | A1 | 5/2005 | Barta et al. | |
| 2005/0265247 | A1* | 12/2005 | Bourke-Dunphy et al. | .. 370/249 |
| 2005/0289538 | A1 | 12/2005 | Black-Ziegelbein et al. | |
| 2006/0080413 | A1* | 4/2006 | Oprea et al. | 709/220 |
| 2006/0179116 | A1* | 8/2006 | Speeter et al. | 709/217 |
| 2007/0156430 | A1 | 7/2007 | Kaetker et al. | |
| 2009/0300164 | A1 | 12/2009 | Boggs et al. | |
| 2010/0083145 | A1 | 4/2010 | Schang et al. | |
| 2010/0162201 | A1* | 6/2010 | Shnaiderman et al. | ....... 717/101 |
| 2011/0035629 | A1* | 2/2011 | Noller et al. | ............... 714/38.14 |

OTHER PUBLICATIONS

"Desktop Central 7," Server and Desktop Management Software, retrieved from http://www.manageengine.com/products/desktop-central/server-management.html on Jun. 29, 2010 (4 pages).
"O & O Enterprise Management Console 3 ," The Central Management for your Network, retrieved from http://www.oo-software.com/corp/en/products/ooemc/index.html on Jun. 29, 2010 (2 pages).
"Patch and Remediation," Lumension Endpoint Management and Security Suite, retrieved from http://www.sans.org/top-cyber-security-risks/summary.php on Jun. 29, 2010 (2 pages).

* cited by examiner

*Primary Examiner* — Philip Wang

(57) ABSTRACT

Systems, methods, and apparatus to deploy software are disclosed. An example method comprises storing a configuration of a software suite at a first computer in an object data store, wherein the software suite comprises a first component and a second component, and wherein the configuration comprises a deployment location for each of the first and second components, and a shared parameter of the first and second components; probing a second computer to determine if the first component is deployed, the second computer being indicated by the deployment location of the first component; retrieving the shared parameter of the first and second components from the object data store; establishing a connection from the first computer to the second computer; and transmitting from the first computer to the second computer an instruction to install the first component using the shared parameter via the connection.

17 Claims, 5 Drawing Sheets

SYSTEMS, METHODS, AND APPARATUS TO DEPLOY SOFTWARE

FIELD OF THE DISCLOSURE

This disclosure relates generally to software deployment and, more particularly, to systems, methods, and apparatus to deploy software.

BACKGROUND

Many companies implementing computerized services seek to provide consistent service to all of their users. Some computerized services require multiple components to operate. For example, a software suite may have a web server front end combined with a database back end. The software suite providing the services may be distributed among multiple computers to provide redundancy and/or balance the processing load among the computers. The web server front end may be hosted by a first computer, while the database back end may be hosted by a second computer.

DETAILED DESCRIPTION

Enterprise software suites typically comprise many software components on many computers. Installing and upgrading the software components of an enterprise software suite is often difficult and typically needs to be performed by experts skilled in installing that particular enterprise software suite. In some situations, there may be tens or hundreds of individual software components having complex inter-dependencies. In many instances, an installation plan for the software components is manually generated by a system administrator. Software components are then individually installed according to the plan.

Typical software installation applications work on one computer at a time in isolation from other computers that include other components of the enterprise software suite. Such individual installation processes are prone to errors as many of the operations are performed by operators, and operators can specify incorrect configurations. Further, when errors are made during installations and/or upgrades, the resulting problems might not manifest until much later in the installation process, or even after the installation process is complete. Such problems are difficult to diagnose and sometimes impractical to fix without re-installing the entire enterprise software suite.

The software deployment system disclosed herein allows a system administrator to develop an installation plan for software components from a single user interface, perform the installation via the interface, validate software configurations and/or installation plans throughout the software installation process, and perform inter-computer dependency checking.

Figure 1:
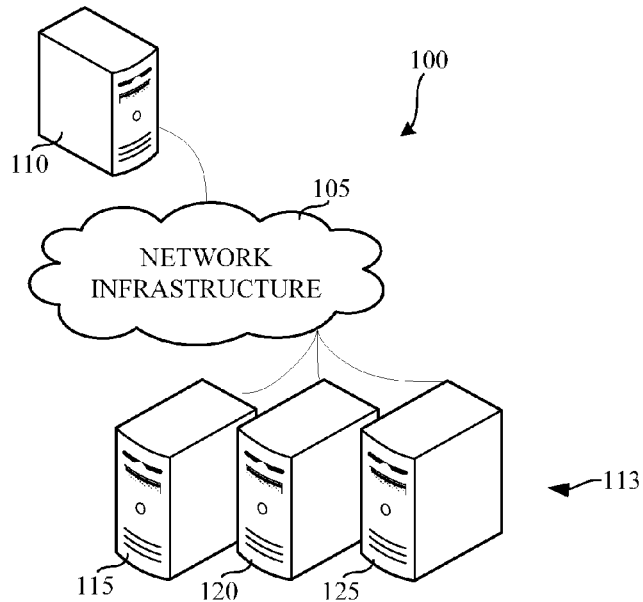
FIG. 1 is a block diagram of an example network.

FIG. 1 is a block diagram of an example network 100. The example network 100 includes a network infrastructure 105, a software deployer 110, and a plurality of computers 113. In the illustrated example, the computers 113 comprise a first computer 115, a second computer 120, and a third computer 125. The network infrastructure 105 of the illustrated example is a wired Ethernet network implementing the Institute of Electrical and Electronics Engineers (IEEE) 802.3 standard. However, any other networking standard may additionally or alternatively be implemented. For example, the network infrastructure 105 may be a wireless network implementing an IEEE 802.11 wireless standard. Further, multiple networking standards may be used within the same network infrastructure. For example, both wireless and wired networking standards may be used. Further still, the network infrastructure 105 may include virtual networks.

The software deployer 110 of the illustrated example is a desktop computer. However, any other type of computing device may additionally or alternatively be used. For example, the software deployer 110 may be implemented by one or more of a laptop computer, a desktop computer, a tablet computer, a server, a mobile device, etc. The software deployer 110 deploys software components of a software suite to the computers 113. The software deployer 110 receives a configuration of a software suite, plans a deployment of the software components of the software suite among the computers 113, and performs the deployment by connecting to each of the computers 113 to transmit the software components and provide instructions to install the software components.

In the illustrated example, each of the computers 113 onto which the software suite is to be deployed is a server. However any other type of computing device(s) may additionally or alternatively be used. For example, the computers 113 may be desktop computers, laptop computers, blade servers, etc. Each of the computers 113 may have any hardware configuration. For example, the computers 113 may have any quantity and type of processors, random access memory (RAM), storage space, etc. The processors of the computers may be any architecture. For example, sixty-four bit processors may be used in the computers 113. The computers 113 may not all be of the same hardware configuration. For example, one of the computers 113 may have a sixty-four bit processor and eight gigabytes of random access memory while another one of the computers 113 may have a thirty-two bit processor and two gigabytes of random access memory. Further, while in the illustrated example, the computers 113 are physical computers, one or more of the computers 113 may be implemented by virtual computers.

Figure 2:
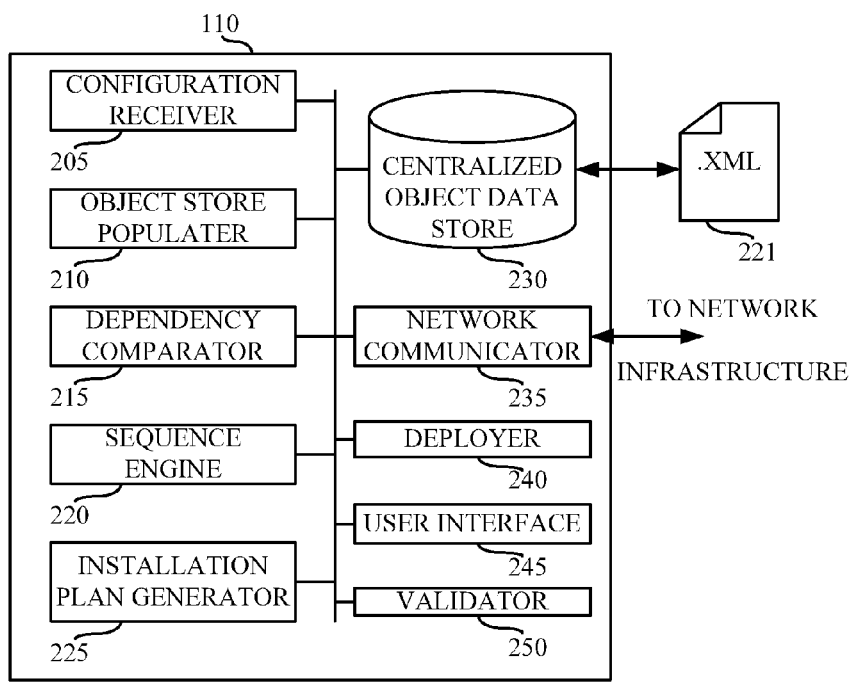
FIG. 2 is a block diagram of the example software deployer shown in FIG. 1.

FIG. 2 is a block diagram of the example software deployer 110 shown in FIG. 1. The software deployer 110 of the illustrated example includes a configuration receiver 205, an object store populater 210, a dependency comparator 215, a sequence engine 220, an installation plan generator 225, a centralized object data store 230, a network communicator 235, a deployer 240, a user interface 245, and a validator 250.

The sequence engine 220 of the illustrated example receives a configuration file 221 representing configuration parameters of a software suite. The configuration file 221 of the illustrated example is an extensible markup language (XML) file. However, any other type of file may additionally or alternatively be used. For example, a comma separated value (CSV) file, a text file, a binary file, etc. may be used. The configuration parameters of the configuration file 221 define parameters of the software suite. For example, the configuration file 221 of the illustrated example defines which components of the software suite will be installed on a given machine. Additionally or alternatively, the configuration file 221 may include information about the machine such as, for example, a processor type, an amount of available memory, an administrator username for accessing the machine, an operating system and/or platform identifier, etc. The configuration file 221 is created by a system administrator and allows the system administrator to specify parameters specific to the deployment of the software suite in a system under the control of the system administrator. The configuration file 221 in the illustrated example is received via the network communicator 235. However, the configuration file 221 may be received in any other manner. For example, a system administrator may input the configuration via the user interface 245.

In some examples, the configuration parameters are shared between components of the software suite. For example, a database may accept connections on a Transmission Control Protocol (TCP) port number and a web application may connect to the database via the port number. In such an example, the port number is a shared parameter between the components that might otherwise be independent. In some examples, the sequence engine 220 inspects the configuration received by the configuration receiver 205. In some cases, the configuration may omit some of the software components of the software suite. For example, a system administrator may not have been aware that a configuration parameter was required for a particular software component.

Further, the software deployer 110 of the illustrated example includes or utilizes a sequence. The sequence may for example, be software or code that defines a list of actions that might be performed to deploy a software suite. For a given software suite, multiple sequences may exist. For example, an example sequence might be used for installing a software suite as a clean install (e.g., the software suite was not previously deployed) while, in another example, an example sequence might be used for upgrading a software suite (e.g., a previous version of the software suite and/or components of the software suite had been installed). In any case, the example sequence is specific to the software suite, but also allows new product families and administration functions to be integrated rapidly into the software deployer 110. In some examples, the example sequence is developed by a sequence designer (e.g., a system administrator) and provided with the software suite to facilitate deployment. In the illustrated example, the sequence is an extensible markup language (XML) file stored within a storage device (e.g., a memory) of the software deployer 110. However any type of file, type of storage, and/or storage may location may additionally or alternatively used.

The sequence engine 220 then manages the sequence by sequentially instructing components of the software deployer 110 to perform actions to deploy the software suite.

The sequence engine 220 invokes the validator 250 to inspect the layout and configuration, and determine if any software components are missing. When a software component is missing (e.g., not already deployed), the missing software component is added to the layout and configuration. In the illustrated example, a user of the software deployer 110 is prompted to accept the changes to the configuration made by the sequence engine 220. However, in other implementations, the sequence engine 220 may not prompt the system administrator to accept the changes.

The example sequence engine 220 may be used when upgrading software components of a previously deployed software suite. For any number of reasons, one or more software components may need to be upgraded. An upgrade to one software component of the software suite may necessitate upgrades to other components. For example, a legacy software suite may have previously been deployed and may require upgrading. In such an example, a web application software component of the software suite may include a new function that requires an update to a web server runtime. In such an example, the sequence engine 220 inspects the previously deployed software components to discover an existing layout and configuration of the deployed software components (e.g., the versions of the deployed software components, the configurations of the deployed software components). By determining the existing layout and configuration, the sequence engine 220 may determine that the web server runtime version (e.g., a legacy version of the web server runtime) does not support the newly added functionality of the web application software component. Thus, in this incorrect version example, the sequence engine 220 may add an updated version of the web server runtime to the upgraded configuration.

After the current deployment status of the software components is known, the sequence engine 220 of the illustrated example generates the order in which software components are to be deployed. In the illustrated example, software components that other components depend upon are deployed prior to dependent software components. However, software components that do not depend on any other components may additionally or alternatively be deployed prior to deployment of other software components. In the foregoing example in which a software component is missing, the sequence engine 220 may determine that the missing software components must be deployed prior to deployment of other software components. In the foregoing example in which an incorrect version of a software component was previously installed, the sequence engine 220 may determine that the web application software component must be deployed after the proper dependencies are installed. However, any other method of determining an order of installation may additionally or alternatively be used.

The configuration receiver 205 of the illustrated example retrieves the configuration of the software components of the software suite and deployment locations for the software components of the software suite. The configuration defines a list of computers to receive the software components (e.g., deployment locations), a list of the software components, where the software components are to be deployed (e.g., one or more computer of the computers 113), and configuration parameters that may be specific to a software component of the software suite and alternatively shared between components of the software suite. In the illustrated example, the list of computers to receive the software components is a list of computer names. However any other method of identifying computers on a network may additionally or alternatively be used. For example, the list of computers may identify the computers by internet protocol (IP) address, media access control (MAC) address, or any other identifier(s).

The example object store populater 210 also discovers the current state of the software components deployed to the computers 115, 120, and 125 via the validator 250. The validator 250 contacts the computers 115, 120, and 125 to determine if a software component having the variables as defined in the configuration is installed. The example object store populater 210 causes the validator 250 to repeatedly check the deployed software components to determine an installation status of the software suite and populates the current configuration into the centralized object data store 230.

The dependency comparator 215 of the illustrated example evaluates the dependencies of the software components of the software suite. In particular, the dependency comparator 215 determines if a first software component of the software suite is dependent on a second software component of the software suite. The software components are not necessarily fully compiled software applications. For example, a software component of a web application may be a JAVA software library allowing the web application to respond to internet requests. In such an example, the web application (e.g., the first software component) may be dependent on the JAVA runtime (e.g., the second software component). While in the example, a web application and the JAVA software library are described, any other software components may additionally or alternatively be used. Software components of the software suite may include libraries, fully compiled applications, interpreted applications (e.g., scripts), configurations, databases, etc.

In addition to analyzing dependencies of software components at a single computer, the dependency comparator 215 of the illustrated example evaluates remote dependencies of software components of the software suite. For example, a remote dependency exists when a first software component to be executed by a first computer is dependent upon the execution of a second software component to be executed by a second computer. For example, to provide load balancing and/or redundancy, a web application (e.g., the first software component) on a first computer displaying information stored in a remote database (e.g., the second software component) on a second computer may be dependent upon the presence, configuration, and/or operability of the remote database. While, in the described example, the first software component is only dependent on the second software component, there may also be other dependencies. For example, the first software component may be dependent on any number of local and/or remote software components. Thus, the web application of the examples described above may be dependent on both a local software library and a remote database.

The installation plan generator 225 of the illustrated example generates an installation plan based on the order in which the software components of the software suite are to be deployed. The installation plan generated by the installation plan generator includes individual steps that must be taken to deploy the software components of the software suite. The individual steps may comprise uninstalling an old version of a software component, validating that an uninstallation was successful, installing a software component, verifying that an installation was successful, configuring a software component, validating a configuration of a software component, etc. The installation plan is stored in the centralized object data store 230. The installation plan is an extensible markup language (XML) representation of the steps to be taken to perform the desired administration functions for a software component of a software suite (e.g., upgrade a software component, configure the software component, verify the software component, etc.). However, any other representation of the installation plan may additionally or alternatively be used such as, for example, a comma delimited representation, a binary representation, a text based representation, etc.

The centralized object data store 230 of the illustrated example stores a model of the topography and a configuration of the software suite. The centralized object data store 230 includes information such as relationships among software components of the software suite and the computers 113. Further, the centralized object data store 230 stores the planned and actual configurations of the software suite. The planned and actual configurations of the software suite are updated by the object store populater 210. Additionally, the centralized object data store 230 stores data such as software component configuration values, internet port assignments, and database configurations. For example, the software suite may include a database that serves data via an authenticated connection (e.g., the connection requires a username and password). In such an example, the centralized object data store 230 may store credentials in association with the software components that request data from the database.

The centralized object data store 230 may be any device for storing data such as, for example, flash memory, magnetic media, optical media, etc. Furthermore, the data stored in the centralized object data store 230 may be in any data format such as, for example, binary data, comma delimited data, tab delimited data, structured query language (SQL), etc. While in the illustrated example the centralized object data store 230 is illustrated as a single database, the centralized object data store 230 may be implemented by multiple databases.

The network communicator 235 of the illustrated example communicates with the computers 113 via the network infrastructure 105. In the illustrated example, the network communicator 235 is a wired Ethernet connection implementing the IEEE 802.3 standard. However any other networking adapter or method of communication with external devices may additionally or alternatively be used such as, for example WiFi connection, a Bluetooth connection, a cellular connection such as Time Division Multiple Access (TDMA), Code Division Multiple Access (CDMA), Worldwide Interoperability for Microwave Access (WiMAX), Long Term Evolution (LTE), etc. Further, while in the illustrated example, the software deployer 110 is present on the same physical network as the computers 113, the network communicator 235 of the software deployer 110 may be a virtual networking adapter communicating with the computers 113 via a virtual private network (VPN).

The deployer 240 of the illustrated example deploys the software components to the computers 113 based on the installation plan created by the installation plan generator 225. The deployer 240 communicates with target computers (e.g., the first, second, and/or third computers 115, 120, 125) via the network communicator 235. Deployment of software components is performed by establishing a connection with the target computer and issuing commands via the connection. The connection is established via a secure shell (SSH) connection. However, any other method of establishing the connection may additionally or alternatively be used. In the illustrated example, a specialized agent does not need to reside on each of the computers 113 to receive commands from the software deployer 110. However, other implementations may utilize specialized agents residing on each computer of the plurality of computers 113. Once the connection is established, the deployer 240 issues commands to the target computer via the connection to complete the installation of the software component. The deployer 240 then repeats the process for each software component to be deployed and each computer on which software components are to be deployed. In the illustrated example, if multiple software components are to be deployed to a target computer, the connection is reused and therefore a second connection to the target computer need not be established. However, the deployer 240 may terminate the connection at the completion of the deployment of each software component and establish a new connection for each software component.

The user interface 245 of the illustrated example allows the user to install, upgrade, and manage the software suite across all of the computers 113. The user interface 245 displays system status to the system administrator and receives input from the system administrator. The user interface 245 includes a sequencing display allowing the system administrator to view and/or edit the parameters and/or deployment locations defined via the configuration file, a layout display allowing the system administrator to view and/or edit the selected software component layouts, a status display allowing the system administrator to quickly determine the current status of the installation, etc. The status display may additionally or alternatively allow the system administrator to drill down into the specifics of the installation (e.g., the commands being issued by the deployer 240, etc.). Further, the status display may allow the system administrator to start and/or stop individual software components of the software suite at any point during, and/or after the software deployment. For example, if a system administrator detects a problem with a software component, they may stop or terminate the component, correct the problem and then start or begin execution of the component.

The validator 250 of the illustrated example validates software components, hardware components, and installation statuses at various stages of deployment. For example, the validator 250 may, after deployment of a first software component, validate that the installation and/or configuration of the first software component completed correctly and that the deployment process is ready to proceed to the next step. While in the example described above, the validator 250 validates the installation and/or configuration of a software component, the validator 250 may additionally or alternatively perform distributed prerequisite checking. Such distributed prerequisite checking may include validation of factors such as computer-to-computer connectivity, clock skew, hardware configurations, etc. The prerequisite checking may be distributed as some tests (e.g., computer connectivity tests) must be performed by multiple computers. For example, in a computer-to-computer connectivity test, the validator 250 instructs a first computer to test connectivity to a second computer, while the validator 250 has also instructed the second computer to receive connections from the first computer. An example validation may comprise checking a processor architecture of a computer. For example, a software library may require a sixty-four bit processor and, therefore, the validator 250 may validate that the software library is associated with (e.g., installed on) a computer having a sixty-four bit processor.

Figure 3:
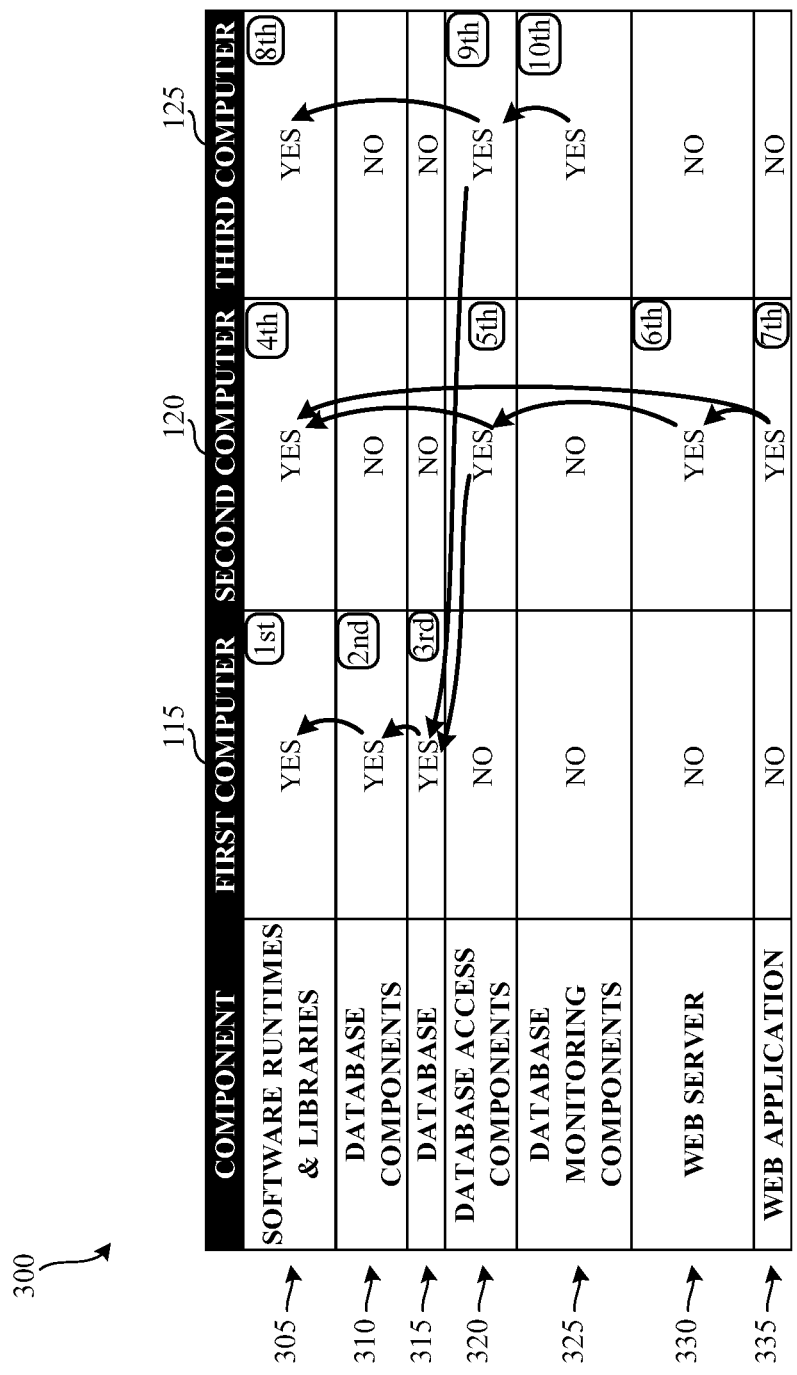
FIG. 3 is a diagram illustrating an example software component layout on the example network of FIG. 1.

FIG. 3 is a diagram illustrating an example software component layout 300 on the example network 100 of FIG. 1. The example layout 300 comprises software components to be deployed to the first computer 115, the second computer 120, and the third computer 125. The software components that are included in the example layout 300 are software runtimes and libraries 305, database components 310, a database 315, database access components 320, database monitoring components 325, a web server 330, and a web application 335. While the example layout 300 illustrates three computers executing software components for a database driven web application, any other software suite having any other layout and/or configuration may additionally or alternatively be used.

The first computer 115 includes the software runtimes and libraries 305, the database components 310, and the database 320. The database components 310 are dependent upon the software runtimes and libraries 305. In the illustrated example, the software runtimes and libraries 305 are runtimes such as runtimes for the JAVA environment. However, any other software runtimes and libraries 305 may additionally or alternatively be used. The database components 310 are software components for executing the database 315. In the illustrated example, the database components 310 are software components of an Oracle database. However, any other type of database may additionally or alternatively used. For example, the database components 310 may be components of a structured query language (SQL) database. The database 315 is dependent upon the database components 310. In the illustrated example, the database 315 comprises database structures such as tables and views for storing and viewing information in the database 315.

The second computer 120 includes software runtimes and libraries 305, the database access components 320, the web server 330, and the web application 335. The database access components 320 are dependent upon both the database 315 of the first computer 115 and the software runtimes and libraries 305 of the second computer 120. The database access component 320 is remotely dependent upon the configuration and operation of the database 315 on the first computer 115. Remote dependencies occur when one software component requires another software component executed by another computer to be installed, configured, and/or operating for proper operation.

Both the database access components 320 and the web application 335 of the illustrated example are dependent upon the software runtimes and libraries 305. However, in the illustrated example, different configurations of the software runtimes and libraries 305 are specified. For example, the database access components 320 require Open Database Connectivity (ODBC) libraries, while the web application 335 requires a Python scripting language runtime. In the illustrated example, there is no conflict between the software runtimes and libraries 305 required by the database access components 320 and the web application 335. However, if there was a conflict (e.g., multiple versions of the same library were required), the system administrator would be informed of the conflict and allowed to manipulate the configuration to avoid the dependency conflict. Further, while in the illustrated example, the software runtimes and libraries 305 are ODBC libraries and Python libraries, any other software runtimes and/or libraries may be additionally or alternatively used.

The third computer 125 includes software runtimes and libraries 305, database access components 320, and database monitoring components 325. Similar to the database access components 320 of the second computer 120, the database access components 320 of the third computer 125 are dependent upon the database 315 of the first computer 115. Further, the database access components 320 of the third computer 125 are also dependent upon the software runtimes and libraries 305 of the third computer 125. The database monitoring components 325 of the third computer 125 are dependent upon the database access components 320 of the third computer 320.

An example order of installation for deployment of the example software component layout 300 may comprise deploying the software components in phases. The software runtimes and libraries 305 of the first computer 115 are deployed in a first phase, the database components 310 of the first computer 115 are deployed in a second phase, and the database 315 of the first computer 115 are deployed in a third phase. Once the first, second, and third phases are complete (e.g., the phases in which software components are deployed to the first computer 115), the software deployer 110 deploys the software components to be deployed to the second computer 120. The software deployer 110 deploys the software runtimes and libraries 305 of the second computer 120 in a fourth phase, the database access components 320 of the second computer 120 in a fifth phase, the web server 330 of the second computer 120 in a sixth phase, and the web application 335 in a seventh phase. Finally, once the fourth through seventh phases are complete (e.g., the phases in which software is to be deployed to the second computer 120), the software deployer 110 deploys the software components to be deployed to the third computer 125. The software deployer 110 deploys the software runtimes and libraries 305 of the third computer 125 in an eighth phase, the database access components 320 of the third computer 125 in a ninth phase, and the database monitoring components 325 of the third computer 125 in a tenth phase. While in the illustrated example, each phase comprises only a single software component, multiple software components may be included in a single phase. For example, the software runtimes and libraries 305 may be deployed to the first computer 115, the second computer 120, and the third computer 125 within a single deployment phase.

While in the illustrated example, software components are deployed to the computers in sequential phases ordered by computer (e.g., all software components of the first computer 115, then all software components of the second computer 120, then all software components of the third computer 125), the software components do not necessarily need to be deployed in that order. For example, all software runtimes and libraries 305 may first be deployed to each of the first computer 115, the second computer 120, and the third computer 125. Further, in the illustrated example, software components are deployed serially. However, the software components may alternatively be deployed in parallel. For example, the software runtimes and libraries 305 to be deployed to each of the first computer 115, the second computer 120, and the third computer 125 may be deployed at the same time, thereby reducing the overall time for deployment but increasing the complexity of monitoring the installation progress. In another example of parallel deployment, after deployment of the database 315 to the first computer 115, the software deployer 110 may deploy software components that are dependent upon the database 315 of the first computer 115 (e.g., the database access components 320 of the second and third computers 120, 125).

While an example manner of implementing the software deployer 110 of FIG. 1 has been illustrated in FIG. 2, one or more of the elements, processes and/or devices illustrated in FIG. 2 may be combined, divided, re-arranged, omitted, eliminated and/or implemented in any other way. Further, the example configuration receiver 205, the example object store populater 210, the example dependency comparator 215, the example sequence engine 220, the example sequence, the example installation plan generator 225, the example centralized object data store 230, the example network communicator 235, the example deployer 240, the example user interface 245, the example validator 250, and/or, more generally, the example software deployer 110 of FIGS. 1 and 2 may be implemented by hardware, software, firmware and/or any combination of hardware, software and/or firmware. Thus, for example, any of the example configuration receiver 205, the example object store populater 210, the example dependency comparator 215, the example sequence engine 220, the example sequence, the example installation plan generator 225, the example centralized object data store 230, the example network communicator 235, the example deployer 240, the example user interface 245, the example validator 250, and/or, more generally, the example software deployer 110 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example configuration receiver 205, the example object store populater 210, the example dependency comparator 215, the example sequence engine 220, the example sequence, the example installation plan generator 225, the example centralized object data store 230, the example network communicator 235, the example deployer 240, the example user interface 245, and/or the example validator 250, and/or, more generally, the example software deployer 110 of FIGS. 1 and 2 are hereby expressly defined to include a computer readable medium such as a memory, DVD, CD, etc. storing the software and/or firmware. Further still, the example software deployer of FIGS. 1 and 2 may include one or more elements, processes and/or devices in addition to, or instead of, those illustrated in FIGS. 1 and 2, and/or may include more than one of any or all of the illustrated elements, processes and devices.

Figure 4:
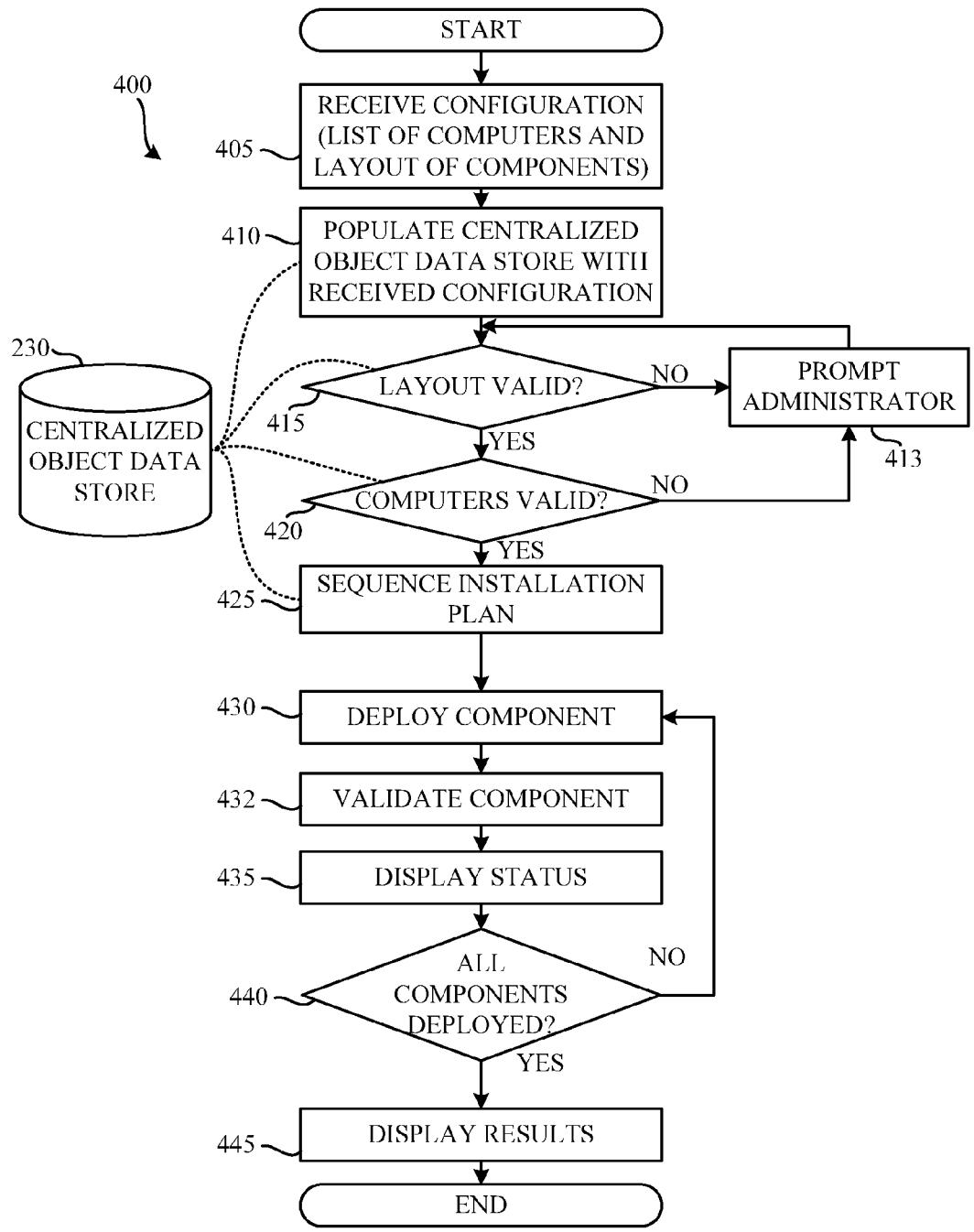
FIGS. 4-6 are flowcharts representative of example processes that may be executed to implement the example software deployer of FIGS. 1 and 2.
Figure 5:
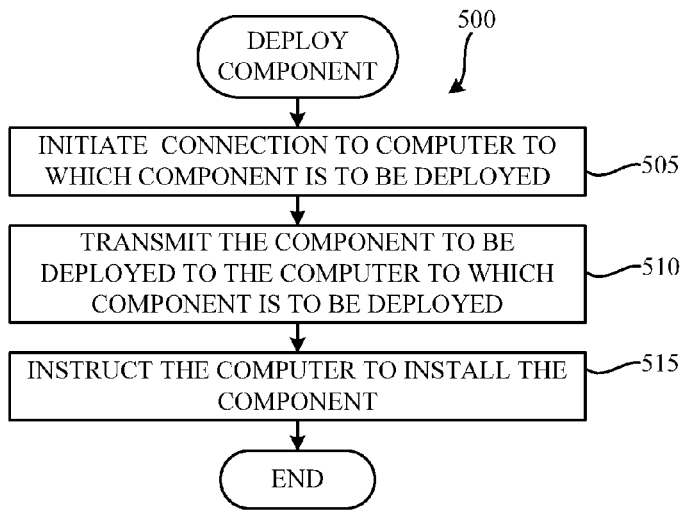
Figure 6:
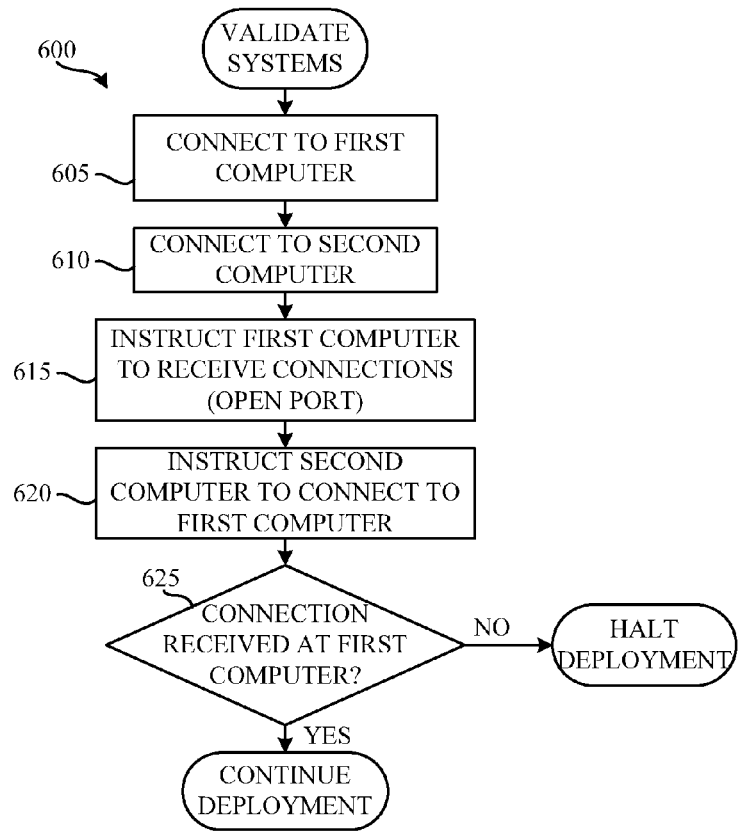

Flowcharts representative of example processes for implementing the software deployer 110 of FIGS. 1 and 2 are shown in FIGS. 4-6. In these examples, the processes comprise a program(s) for execution by a processor such as a processor 712 shown in an example computer 700 discussed below in connection with FIG. 7. The program may be embodied in software stored on a computer readable medium such as a CD-ROM, a floppy disk, a hard drive, a digital versatile disk (DVD), or a memory associated with the processor 712, but the entire program and/or parts thereof could alternatively be executed by a device other than the processor 712 and/or embodied in firmware or dedicated hardware. Further, although the example program(s) is described with reference to the flowcharts illustrated in FIGS. 4-6, many other methods of implementing the example software deployer 110 may alternatively be used. For example, the order of execution of the blocks may be changed, and/or some of the blocks described may be changed, eliminated, or combined.

As mentioned above, the example processes of FIGS. 4-6 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4-6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

FIG. 4 is a flowchart representative of an example process 400 that may be executed to implement an example deployment process of the example software deployer of FIGS. 1 and 2. The process of FIG. 4 begins at block 405, when the configuration receiver 205 of the software deployer 110 receives a configuration representing software components of a software suite and computers on which the software components are to be installed (block 405). The configuration includes a list of computers included in a software suite deployment and a layout of the software components of the software suite among the computers. In the illustrated example, the centralized object data store 230 receives the configuration file 221 (block 410) via an XML interpreter. However any other method of receiving the configuration may additionally or alternatively be used. For example, the centralized object data store 230 may receive the configuration via user input, and/or user input may be used to supplement the configuration file. Further, while in the illustrated example an XML configuration file is used, any other type of file specifying the configuration may additionally or alternatively be used.

The validator 250 then proceeds to validate the configuration (block 415). Validation is performed to determine if all software components are placed on a computer. For example, if a configuration specified a web application serving data from a database, but no configuration parameters for the database were present, the configuration would fail validation. If validation failed, an administrator is prompted to correct the error (block 413). The configuration is then re-validated to determine that no other validation problems exist.

If the layout is valid (block 415), the validator 250 validates the computers to which the software components of the software suite are to be deployed (block 420). In determining if the computers are valid, the validator 250 of the illustrated example checks computer-to-computer connectivity, clock skew, and hardware configurations. The computer-to-computer connectivity test is described in more detail in conjunction with FIG. 6. If the validator 250 encounters any errors in validation, the administrator is prompted (block 413). The administrator may then correct any configuration errors. Control then proceeds to block 415 where the layout is re-validated to ensure that any layout changes to account for a computer validation error encountered in block 420 are valid. If there are no validation errors, control proceeds to block 425.

The installation plan generator 225 then sequences an installation plan according to the configuration stored in the centralized object data store and the sequence (block 425). For example, the installation plan may be sequenced based on the configuration shown in FIG. 3. In such an example, the installation plan may be sequenced such that the order of installation is based on dependency of the components of the software suite. For example, components with no dependencies may be installed first, with components dependent upon the components with no dependencies being sequentially installed until all components are deployed. In the illustrated example, the installation plan is structured such that components are deployed serially (e.g., one at a time), however alternative installation plans may be structured such that components are deployed in parallel.

The deployer 240 then deploys a software component of the software suite according to the installation plan (block 430). The deployment process is described in detail in conjunction with FIG. 5. Once the software component is deployed, control proceeds to block 435 where an updated status of the installation is displayed via the user interface 245. Additionally or alternatively, the validator 250 may validate that the software component installed by the deployer 240 in block 430 was deployed properly, configured properly, and/or is functioning properly (block 432). If validation of the deployed software component fails, the administrator may be prompted to correct the errors. This additional validation step may be performed at any time during the installation process. In the illustrated example, software components are validated as they are deployed, however alternative validation techniques may validate multiple software components at the end of the deployment process.

Next, the deployer 240 determines if all software components have been deployed (block 440). If additional software components need to be deployed, control returns to block 430 where subsequent software components are deployed according to the installation plan. If all software components have been deployed, the user interface 245 displays installation results (block 445). For example, the user interface 245 displays a table having a list of each component deployed, each validation performed, and the results thereof. However, any other format of displaying results may additionally or alternatively be used.

FIG. 5 is a flowchart representative of an example process 500 that may be executed to implement the example software deployer of FIGS. 1 and 2. The example process 500 implements the deployment process of the deployer 240, at block 430 of FIG. 4. The process of FIG. 5 begins at block 505 when the deployer 240 initiates a connection to a computer to which a software component is to be deployed. The connection in the illustrated example is an SSH connection and allows the deployer 240 to send commands to the computer over the network infrastructure 105. However, any other type of connection may additionally or alternatively be used such as, for example, a terminal connection, an FTP connection, etc. Next, the deployer 240 transmits the software component to be deployed to the computer via the connection (block 510). In the illustrated example, the deployer 240 transmits the software component via the SSH connection. However, in other implementations, another alternative connection may be opened such as, for example, an FTP connection. Finally, the deployer 240 instructs the computer to install the software component (block 515). In the illustrated example, the deployer 240 instructs the computer to install the software component via the connection established in block 505. Once the software component is installed, the process 500 of FIG. 5 complete execution and control returns to block 430 of FIG. 4.

FIG. 6 is a flowchart representative of example process 600 that may be executed to implement the computer connectivity validation of the block 420 of FIG. 4. The computer connectivity validation is one of many types of validation that may be implemented by the validator 250 as part of the computer validation block (block 420) of FIG. 4. The computer connectivity validation confirms that a first computer can communicate with a second computer. For example, if a database is installed on the first computer and a web application serving data stored in the database is installed on the second computer, the second computer must be able to communicate with the first computer.

The process of FIG. 6 begins at block 605, where the validator 250 connects to the first computer 115. In the illustrated example, the validator 250 connects to the first computer 115 via the network communicator 235 by creating an SSH connection. However, any other type of connection may additionally or alternatively be used. Next, the validator 250 connects to the second computer 120 via a similar connection (block 610). The validator 250 then instructs the first computer 115 to receive a connection from the second computer 120 (block 615). In the illustrated example, the first computer 115 listens for a connection request on an unused port; however, any other method of receiving and/or waiting for a connection may additionally or alternatively be used. Next, the validator 250 instructs the second computer 120 to connect to the first computer 115 (block 620). The validator 250 then determines if the connection request from the second computer 120 to the first computer 115 was received by the first computer 115 (block 625). For example, the validator 250 may query the first computer to determine if the connection was received from the second computer. If the connection was received, the validator 250 completes the computer connectivity validation and returns to block 420 of FIG. 4. If the connection was not received, the validator 250 halts deployment by returning to block 420 of FIG. 4 and control proceeds to block 413 to prompt the administrator.

Figure 7:
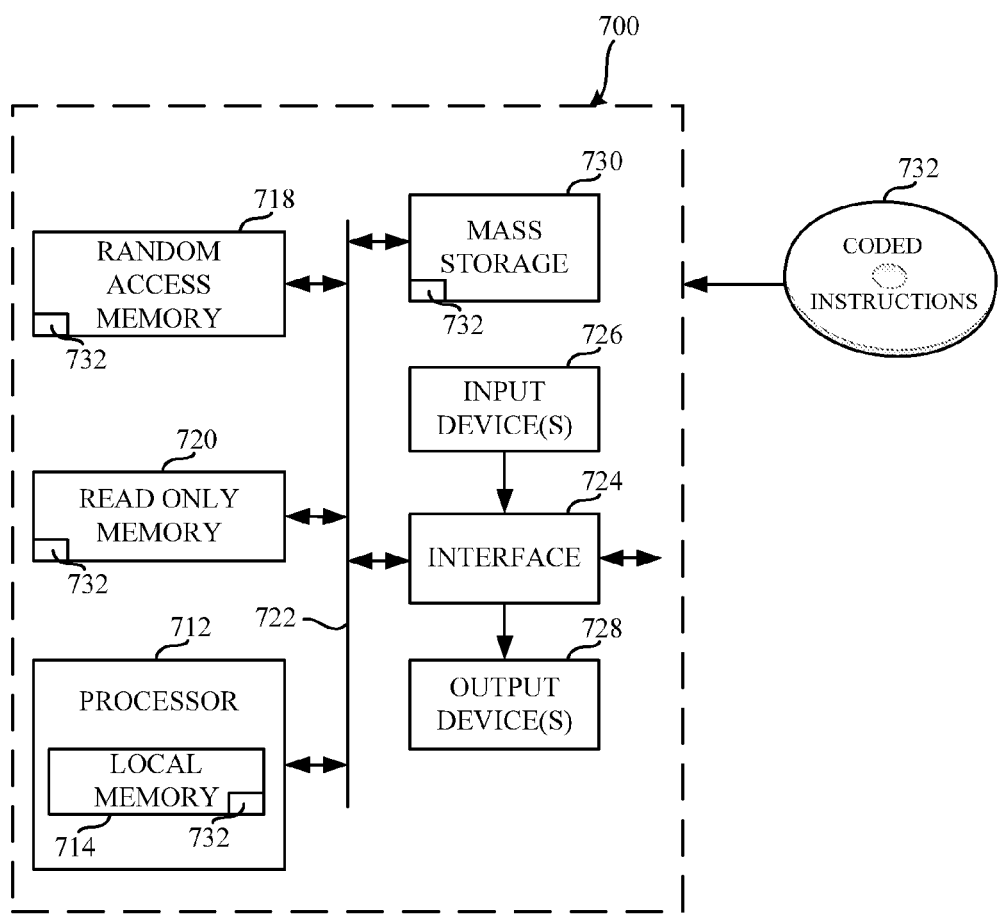
FIG. 7 is a block diagram of an example computer that may execute, for example, the processes of FIGS. 4-6 to implement the example software deployer of FIGS. 1 and 2.

FIG. 7 is a block diagram of an example computer 700 capable of executing the processes of FIGS. 4-6 to implement the software deployer 110 of FIGS. 1 and 2. The computer 700 can be, for example, a server, a personal computer (e.g., a laptop or a desktop), a mobile phone (e.g., a cell phone), a personal digital assistant (PDA), an Internet appliance, or any other type of computing device.

The system 700 of the instant example includes a processor 712. For example, the processor 712 can be implemented by one or more Intel® microprocessors from the Pentium® family, the Itanium® family or the XScale® family. Of course, other processors from other families are also appropriate.

The processor 712 is in communication with a main memory including a volatile memory 718 and a non-volatile memory 720 via a bus 722. The volatile memory 718 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 714 is typically controlled by a memory controller (not shown).

The computer 700 also includes an interface circuit 724. The interface circuit 724 may be implemented by any type of interface standard, such as an Ethernet interface, a universal serial bus (USB), and/or a PCI express interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, isopoint and/or a voice recognition system.

One or more output devices 728 are also connected to the interface circuit 724. The output devices 728 can be implemented, for example, by display devices (e.g., a liquid crystal display, a cathode ray tube display (CRT), a printer and/or speakers). The interface circuit 724, thus, typically includes a graphics driver card.

The interface circuit 724 also includes a communication device (e.g., the network communicator 235) such as a modem or network interface card to facilitate exchange of data with external computers via a network (e.g., an Ethernet connection, a digital subscriber line (DSL), a telephone line, coaxial cable, a cellular telephone system, etc.).

The computer 700 also includes one or more mass storage devices 730 for storing software and data. Examples of such mass storage devices 730 include floppy disk drives, hard drive disks, compact disk drives and digital versatile disk (DVD) drives. The mass storage device 730 may implement the centralized object data store 230.

The coded instructions 732 of FIGS. 4-6 may be stored in the mass storage device 730, in the volatile memory 718, in the non-volatile memory 720, and/or on a removable storage medium such as a CD or DVD.

From the foregoing, it will appreciated that the above disclosed methods, apparatus and articles of manufacture allows the sequence designer (e.g., a system administrator) to develop an installation plan for all software components from a single user interface, perform the installation via the interface, validate software configurations and/or installation plans throughout the software installation process, and perform inter-computer dependency checking.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
    storing a configuration of a software suite at a first computer in an object data store, wherein the software suite comprises a first component and a second component, and wherein the configuration comprises (1) a deployment location for each of the first and second components, and (2) a shared parameter of the first and second components;
    probing a second computer to determine if the first component is deployed, the second computer being indicated by the deployment location of the first component;
    retrieving the shared parameter of the first and second components from the object data store;
    establishing a first connection from the first computer to the second computer;
    validating that the second computer can communicate with a third computer, the third computer different than the first computer, the third computer being indicated by the deployment location of the second component; and
    in response to the validating, transmitting from the first computer to the second computer an instruction to install the first component using the shared parameter via the first connection.

2. The method as described in claim 1, further comprising determining if the second computer is capable of executing the first component.

3. The method as described in claim 2, wherein transmitting the instruction to install the first component is performed only when the second computer is capable of executing the first component.

4. The method as described in claim 2, further comprising prompting a user to provide an alternate deployment location if the second computer is not capable of executing the first component.

5. The method as described in claim 1, further comprising:
    probing a third computer to determine if the second component is deployed;
    establishing a second connection from the first computer to the third computer; and
    transmitting from the first computer to the third computer an instruction to install the second component using the shared parameter via the second connection.

6. The method as described in claim 1, further comprising populating the object data store by scanning the deployment locations of the first and second components for existing component layouts and software configurations.

7. The method as described in claim 1, wherein the first connection is a secure shell connection.

8. The method as described in claim 1, further comprising displaying at the first computer an installation status of the first and second components.

9. A method comprising:
    storing a configuration of a software suite at a first computer in an object data store, the software suite comprising a first component and a second component, and the configuration comprising a (1) deployment location for each of the first and second components and (2) a shared parameter of the first and second components;

probing a second computer to determine if the first component is deployed, the second computer being indicated by the deployment location of the first component;

retrieving the shared parameter of the first and second components from the object data store;

establishing a first connection from the first computer to the second computer;

transmitting from the first computer to the second computer an instruction to install the first component using the shared parameter via the first connection; and determining if the second computer is capable of communication with a third computer by:

establishing a second connection from the first computer to the third computer, the third computer being indicated by the deployment location of the second component;

instructing, via the second connection, the third computer to accept a third connection from the second computer;

instructing, via the first connection, the second computer to connect to the third computer by establishing the third connection; and determining, via the second connection, whether the third computer received a connection request from the second computer, wherein transmitting the instruction to install the first component is performed only when the third computer received the connection request from the second computer.

10. An apparatus to deploy software, the apparatus comprising:

a sequence engine to receive a configuration comprising a configuration parameter of a component of a software suite and a deployment location of the component, the sequence engine to control execution of a sequence;

an object data store to store the configuration parameter and the deployment location;

an object store populater to discover an existing component deployment location and configuration parameter, the object store populate to store the existing component deployment location and configuration parameter in the object data store;

a dependency comparator to determine that a first component of the software suite to be installed on a first computer is dependent upon a second component of the software suite to be installed on a second computer;

a validator to validate that the first computer can communicate with the second computer; and a deployer to establish a connection to the first computer and to instruct the first computer to install the first component when the first computer can communicate with the second computer.

11. The apparatus as described in claim 10, further comprising an installation plan generator to generate an installation plan based on the order of actions, the installation plan identifying the first component and the second component, a deployment location of each of the first and second components, and an order in which the first and second components are to be installed.

12. The apparatus as described in claim 11, wherein the installation plan generator removes components from the installation plan that are determined to be installed by the object store populater.

13. The apparatus as described in claim 10, wherein the object store populater is to inspect a deployment location of a first component after the deployer instructs the first computer to install the first component to determine if the first component was installed in response to the instruction.

14. The apparatus as described in claim 10, wherein the connection established by the deployer is a secure shell connection.

15. The apparatus as described in claim 10, wherein the deployer additionally transmits the first component to the first computer.

16. A storage disc or storage device comprising instructions which when executed cause a machine to at least:

receive a configuration representing components of a software suite and computers on which the components are to be installed, the configuration identifying a first component to be installed on a first computer and a second component to be installed on a second computer;

determine that the second component is dependent upon the first component;

determine that the first component should be installed in a first installation phase and that the second component should be installed in a second installation phase;

generate an installation sequence identifying the components of the software suite, the computers on which the components are to be installed, and a phase in which the components are to be installed;

initiate a first connection to the first computer;

instruct the first computer to install the first component via the first connection;

initiate a second connection to the second computer; validate that the second computer can communicate with the first computer; and instruct the second computer to install the second component via the second connection when the second computer can communicate with the first computer.

17. The storage disc or storage device as described in claim 16, wherein a third component to be installed on the second computer is identified by the configuration file, the second component being dependent upon the third component; and wherein the instructions, when executed, further cause the machine to at least determine that the third component should be installed in the first installation phase.

* * * * *